United States Patent
Kim

(10) Patent No.: US 11,190,957 B2
(45) Date of Patent: Nov. 30, 2021

(54) APPARATUS AND METHOD FOR CONTROLLING VEHICLE BASED ON REDUNDANT ARCHITECTURE

(71) Applicant: MANDO CORPORATION, Gyeonggi-do (KR)

(72) Inventor: Hyun Jung Kim, Gyeonggi-do (KR)

(73) Assignee: MANDO CORPORATION, Gyeonggi-Do (KR)

(*) Notice: Subject to any disclaimer, the term of this patent is extended or adjusted under 35 U.S.C. 154(b) by 207 days.

(21) Appl. No.: 16/264,678

(22) Filed: Feb. 1, 2019

(65) Prior Publication Data
US 2019/0246294 A1 Aug. 8, 2019

(30) Foreign Application Priority Data
Feb. 5, 2018 (KR) .......................... 10-2018-0013793

(51) Int. Cl.
*H04W 24/04* (2009.01)
*H04W 4/48* (2018.01)
(Continued)

(52) U.S. Cl.
CPC ......... *H04W 24/04* (2013.01); *B60R 16/0232* (2013.01); *H04W 4/48* (2018.02); *H04W 40/02* (2013.01); *B62D 5/0481* (2013.01)

(58) Field of Classification Search
CPC ....... H04W 24/04; H04W 4/48; H04W 40/02; B60R 16/0232; B60R 16/0231; B62D 5/0481; B60W 50/023
(Continued)

(56) References Cited

U.S. PATENT DOCUMENTS

2007/0156310 A1* 7/2007 Hirano ................ B60W 50/029
                                                                701/31.8
2009/0138137 A1* 5/2009 Iwagami ............. G06F 11/0739
                                                                701/1
(Continued)

FOREIGN PATENT DOCUMENTS

JP       2005-521182         7/2005
JP       2005-521182 A   *   7/2005
(Continued)

OTHER PUBLICATIONS

Notice of Allowance dated Mar. 19, 2020 for Korean Application No. 10-2018-0013793 and its English machine translation by Google Translate.
(Continued)

*Primary Examiner* — Jonathan M Dager
*Assistant Examiner* — Jean W Charleston
(74) *Attorney, Agent, or Firm* — Ladas & Parry, LLP

(57) ABSTRACT

Disclosed are an apparatus and a method for controlling a vehicle based on redundant architecture, and more particularly, a technology for monitoring breakdown of communication paths of a vehicle control device based on redundant architecture. The apparatus includes: a plurality of electronic controllers configured to control driving of the vehicle based on sensing information of the vehicle; and a plurality of communication paths configured to exchange data between the plurality of electronic controllers, wherein the plurality of electronic controllers are configured to generate a vehicle control instruction for controlling driving of the vehicle based on vehicle information and are configured to monitor an operational status of at least one of the plurality of electronic controllers through the plurality of communication paths.

16 Claims, 4 Drawing Sheets

(51) Int. Cl.
  *B60R 16/023*  (2006.01)
  *H04W 40/02*  (2009.01)
  *B62D 5/04*   (2006.01)
(58) Field of Classification Search
  USPC ........................................................ 701/29.2
  See application file for complete search history.

(56) References Cited

U.S. PATENT DOCUMENTS

| 2009/0240384 | A1* | 9/2009  | Ikemoto .................. B60L 1/003 |
|              |     |         | 701/1                                 |
| 2009/0312898 | A1* | 12/2009 | Hashimoto ........ G05B 19/0428       |
|              |     |         | 701/29.1                              |
| 2019/0132242 | A1* | 5/2019  | Gota ...................... H04W 24/08 |
| 2019/0143965 | A1* | 5/2019  | Driscoll ............... G05D 1/0038  |
|              |     |         | 701/41                                |

FOREIGN PATENT DOCUMENTS

| JP | 2010-143458    |   | 7/2010  |
| JP | 2013-222992    |   | 10/2013 |
| JP | 2013222992   A | * | 10/2013 |
| KR | 10-1203872     |   | 11/2012 |
| KR | 10-2016-0110203|   | 9/2016  |

OTHER PUBLICATIONS

Office Action dated May 1, 2019 for Korean Application No. 10-2018-0013793 and its English machine translation by Google Translate.

* cited by examiner

APPARATUS AND METHOD FOR CONTROLLING VEHICLE BASED ON REDUNDANT ARCHITECTURE

CROSS REFERENCE TO RELATED APPLICATION

This application claims priority from Korean Patent Application No. 10-2018-0013793, filed on Feb. 5, 2018, which is hereby incorporated by reference for all purposes as if fully set forth herein.

BACKGROUND OF THE INVENTION

1. Field of the Invention

The present disclosure relates to an apparatus and a method for controlling a vehicle based on redundant architecture and more particular to a technology for monitoring a breakdown of a communication path of a vehicle control device based on redundant architecture.

2. Description of the Prior Art

In an Electronic Power Steering (EPS) system, a steering control is performed by an Electronic Control Unit (ECU) based on information collected through a vehicle sensor. Redundant architecture having a plurality of sensors or a plurality of electronic controllers has been researched to increase stability of steering in the EPS system. If a communication path for monitoring a breakdown of a plurality of electronic controllers has a problem in the vehicle control system having redundant architecture, it may be misrecognized that the electronic controller has broken down.

SUMMARY OF THE INVENTION

Accordingly, an aspect of the present disclosure is to provide a technology for monitoring a breakdown of a communication path of an electronic control device.

Another aspect of the present disclosure is to provide a technology for monitoring a breakdown of a communication path of a vehicle control device having redundant architecture.

Another aspect of the present disclosure is to provide a technology for monitoring a breakdown of a communication path of a vehicle control device having redundant architecture including a plurality of communication paths.

In accordance with an aspect of the present disclosure, an apparatus for controlling a vehicle having redundant architecture is provided. The apparatus includes: a plurality of electronic controllers configured to control driving of the vehicle based on sensing information of the vehicle; and a plurality of communication paths configured to exchange data between the plurality of electronic controllers, wherein the plurality of electronic controllers are configured to generate a vehicle control instruction for controlling driving of the vehicle based on vehicle information and are configured to monitor an operational status of at least one of the plurality of electronic controllers through the plurality of communication paths.

In accordance with another aspect of the present disclosure, a method of controlling a vehicle by a vehicle control device of redundant architecture including a plurality of electronic controllers for controlling driving of the vehicle based on sensing information of the vehicle and a plurality of communication paths for exchanging data between the plurality of electronic controllers is provided. The method includes: generating its own operational status information by at least one of the plurality of electronic controllers; receiving operational status information of another electronic controller based on the operational status information received through the plurality of communication paths by at least one of the plurality of electronic controllers; and determining whether at least one of the plurality of communication paths has broken down based on the operational status information received through the plurality of communication paths by the another electronic controller.

According to an embodiment of the present disclosure, it is possible to monitor a breakdown of a communication path of an electronic control device.

According to another embodiment of the present disclosure, it is possible to monitor a breakdown of a communication path of a vehicle control device having redundant architecture.

According to another embodiment of the present disclosure, it is possible to monitor a breakdown of a communication path of a vehicle control device having redundant architecture including a plurality of communication paths.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
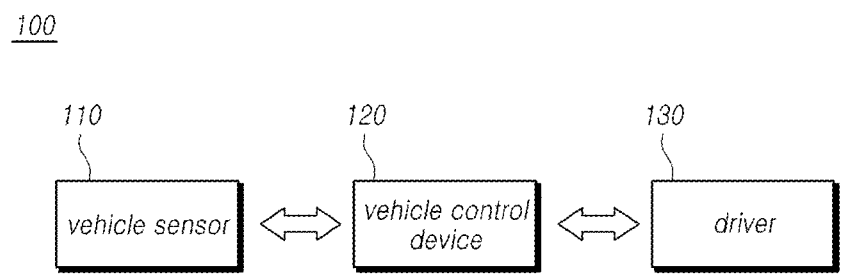
FIG. 1 is a block diagram illustrating a vehicle control system having redundant architecture according to an embodiment of the present disclosure.

The present disclosure may have various modifications and embodiments, and thus particular embodiments illustrated in the drawings will be described in detail in the following description. However, it should be understood that there is no intent to limit the present disclosure to the particular forms disclosed, but on the contrary, the present disclosure is to cover all modifications, equivalents, and alternatives falling within the spirit and scope of the disclosure. Further, in the description of the present disclosure, if it is determined that the detailed description of the related well-known technologies unnecessarily make the subject matter of the present disclosure unclear, the detailed description will be omitted. A singular expression as used in the specification and the claims should be construed as meaning "one or more" unless indicated otherwise.

Hereinafter, embodiments of the present disclosure will be described in detail with reference to the accompanying drawings, and in the description with reference to the accompanying drawings, the same or corresponding components have the same reference numeral, and a duplicate description therefor will be omitted.

FIG. 1 is a block diagram illustrating a vehicle control system having redundant architecture according to an embodiment of the present disclosure;

Referring to FIG. 1, a vehicle control system 100 having redundant architecture according to an embodiment may include a vehicle sensor 110, a vehicle control device 120, and a driver 130.

The vehicle sensor 110 is an integrated sensor mounted to a vehicle, and may sense a status of the vehicle, generate sensed vehicle information, and transmit the same to the vehicle control system.

According to an embodiment, the vehicle sensor 110 may be a steering angle sensor. Specifically, the vehicle sensor 110 may sense a steering angle of a steering wheel input by a driver and transmit steering angle information to the vehicle control device 120.

According to an embodiment, the vehicle sensor 110 may be a torque sensor. Specifically, the vehicle sensor 110 may sense steering torque input by the driver into steering wheels and transmit torque information to the vehicle control device 120.

According to an embodiment, the vehicle sensor 110 may be a vehicle speed sensor. Specifically, the vehicle sensor 110 may sense a speed of the vehicle and transmit sensed vehicle speed information to the vehicle control device 120.

The vehicle control device 120 may control driving of the vehicle. Specifically, the vehicle control device 120 may generate a vehicle control instruction for controlling driving of the vehicle based on vehicle information received from the vehicle sensor 110. The vehicle control device 120 may transmit the generated vehicle control instruction to the driver 130. According to an embodiment, the vehicle control device 120 may have redundant architecture including a plurality of Electronic Control Units (ECUs) for generating a vehicle control instruction. For example, the vehicle control device 120 may include a first electronic controller 210 and a second electronic controller 220. Further, if the first electronic controller 210 has broken down, the second electronic controller 220 of the vehicle control device 120 may control driving of the vehicle.

In addition, the vehicle control device 120 may include a plurality of communication paths for exchanging data between a plurality of electronic controllers. At this time, the vehicle control device 120 may monitor the plurality of communication paths and ignore data received through a communication path having broken down among the plurality of communication paths.

Hereinafter, a detailed description of the vehicle control device 120 will be made below with reference to FIGS. 2 to 4.

The driver 130 may drive the vehicle. Specifically, the driver 130 may drive the vehicle according to the vehicle control instruction received from the vehicle control device 120. The driver 130 may include all elements for driving the vehicle such as an assist motor and the like.

Figure 2:
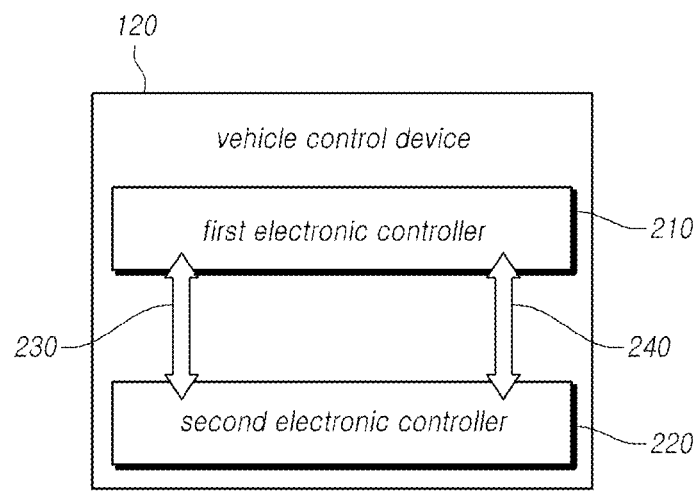
FIG. 2 is a block diagram illustrating the vehicle control device according to an embodiment of the present disclosure.

FIG. 2 is a block diagram illustrating the vehicle control device according to an embodiment of the present disclosure.

Referring to FIG. 2, the vehicle control device 120 according to an embodiment may include a plurality of electronic controllers, and a plurality of communication paths.

The first electronic controller 210 may control driving of the vehicle. Further, the first electronic controller 210 may monitor an operational status of the vehicle control device 120.

According to an embodiment, the first electronic controller 210 may generate a vehicle control instruction for controlling driving of the vehicle. Specifically, the first electronic controller 210 may receive vehicle information from the vehicle sensor 110. The first electronic controller 210 may generate a vehicle control instruction for controlling driving of the vehicle based on the received vehicle information. The first electronic controller 210 may transmit the generated vehicle control instruction to the driver 130.

According to an embodiment, the first electronic controller 210 may not control the vehicle if the first vehicle controller has broken down.

According to an embodiment, the first electronic controller 210 may monitor an operational status of the vehicle control device 120. Specifically, the first electronic controller 210 may generate operational status information of the first electronic controller and transmit the generated operational status information to the second electronic controller 220 through each of the plurality of communication paths. The operational status information may be information which can be used for determining whether the electronic controller has broken down.

According to an embodiment, the first electronic controller 210 may prevent the vehicle from being controlled. For example, if it is determined that the vehicle cannot be controlled by the first electronic controller 210, the first electronic controller 210 may prevent the vehicle from being controlled.

According to an embodiment, the first electronic controller 210 may monitor an operational status of the second electronic controller 220. Specifically, the first electronic controller 210 may receive operational status information of the second electronic controller 220 from the second electronic controller 220. The first electronic controller 210 may determine whether the second electronic controller 220 has broken down based on the operational status information of the second electronic controller 220.

According to an embodiment, the first electronic controller 210 may determine whether a plurality of communication paths has broken down. For example, the first electronic controller 210 may receive the same data from the second electronic controller 220 through each of the plurality of communication paths. The first electronic controller 210 may determine whether at least one of the plurality of communication paths has broken down by comparing the data received through the plurality of communication paths. At this time, the first electronic controller 210 may ignore the data received through the communication path having broken down and may determine the operational status of the second electronic controller 220, that is whether the second electronic controller 220 has broken down based on the data received through communication paths which have not broken down. Further, the first electronic controller 210 may determine whether the communication paths have broken down based on reliability of a communication scheme of each of the plurality of communication paths. For example, if the operational status of the first electronic controller 210 included in the data received through a first communication path is normal and the operational status of the first electronic controller 210 received through a second communication path is abnormal, the first electronic controller 210 may determine that the second communication path has not broken down and the first communication path has broken down.

The second electronic controller 220 may control driving of the vehicle. Further, the second electronic controller 220 may monitor an operational status of the vehicle control device 120.

According to an embodiment, the second electronic controller 220 may generate a vehicle control instruction for controlling driving of the vehicle. Specifically, the second electronic controller 220 may receive vehicle information from the vehicle sensor 110. The second electronic controller 220 may generate a vehicle control instruction for controlling driving of the vehicle based on the received vehicle information. The second electronic controller 220 may transmit the generated vehicle control instruction to the driver 130.

According to an embodiment, the second electronic controller 220 may control the vehicle if the first vehicle controller has broken down.

According to an embodiment, the second electronic controller 220 may monitor an operational status of the vehicle control device 120. Specifically, the second electronic controller 220 may generate operational status information of the second electronic controller and transmit the generated operational status information to the first electronic controller 210 through each of the plurality of communication paths.

According to an embodiment, the second electronic controller 220 may prevent the vehicle from being controlled. For example, if it is determined that the vehicle cannot be controlled by the first electronic controller 210, the second electronic controller 220 may prevent the vehicle from being controlled.

According to an embodiment, the second electronic controller 220 may monitor an operational status of the first electronic controller 220. Specifically, the second electronic controller 220 may receive operational status information of the first electronic controller 210 from the first electronic controller 210. The second electronic controller 220 may determine whether the first electronic controller 210 has broken down based on the operational status information of the first electronic controller 210.

According to an embodiment, the second electronic controller 220 may determine whether a plurality of communication paths has broken down. For example, the second electronic controller 220 may receive the same data from the first electronic controller 210 through each of the plurality of communication paths. The second electronic controller 220 may determine whether at least one of the plurality of communication paths has broken down by comparing the data received through the plurality of communication paths. At this time, the second electronic controller 220 may ignore the data received through the communication path having broken down and may determine the operational status of the first electronic controller 210, that is whether the first electronic controller 210 has broken down based on the data received through communication paths which have not broken down. Further, the second electronic controller 220 may determine whether the communication paths have broken down based on reliability of a communication scheme of each of the plurality of communication paths. For example, if the operational status of the first electronic controller 210 included in the data received through a first communication path is normal and the operational status of the first electronic controller 210 received through a second communication path is abnormal, the second electronic controller 220 may determine that the second communication path has not broken down and the first communication path has broken down.

According to an embodiment, each of the plurality of electronic controllers monitors a driving voltage applied to each electronic controller, and if a driving voltage measured by the electronic controller of one of the electronic controllers is equal to or smaller than a preset reference voltage, the corresponding electronic controller transmits a low-voltage flag signal through a plurality of communication paths as operational status information. Another electronic controller except the electronic controller of which the measured driving voltage is equal to or smaller than the preset reference voltage may determine the status of the electronic controller transmitting data based on data received through each of the plurality of communication paths. If the another electronic controller receives a low-voltage flag, the another electronic controller may determine that the status of the electronic controller of which the measured driving voltage is equal to or smaller than the preset reference voltage is abnormal, that is, determine that the corresponding electronic controller has broken down and may control driving of the vehicle after a predetermined time from a time point at which a low-voltage flag signal (operational status information) is received.

The following example will be described based on the vehicle control device of FIG. 2. The first electronic controller 210 monitors a driving voltage applied to the first electronic controller 210 and the second electronic controller 220 monitors a driving voltage applied to the second electronic controller 220. If the first electronic controller 210 detects that the driving voltage applied to the first electronic controller 210 is equal to or smaller than a preset reference voltage, the first electronic controller 210 transmits a low-voltage flag signal to a plurality of communication paths. The low-voltage flag signal indicates that the driving voltage applied to the electronic controller cannot drive the corresponding electronic controller. If the second electronic controller 220 receives the low-voltage flag signal, the second electronic controller 220 determines that the first electronic controller 210 has broken down and controls driving of the vehicle after a predetermined time from a time point at which the low-voltage flag signal is received. Here, the time after a predetermined time from a time point at which the low-voltage flag signal is received is a time earlier than the conventional standby time for control transition after it is determined that the electronic controller has broken down. In other words, in the present disclosure, a time point of the control transition of the electronic controller is a time point after a predetermined time from a time point at which the low-voltage flag signal is received rather than a time point after a predetermined time from a time point at which the electronic controller breaks down. Accordingly, if one electronic controller has broken down, the control transition to another electronic controller can be rapidly performed, so that vehicle driving stability can be improved.

Through a plurality of communication paths, data can be exchanged between a plurality of electronic controllers. The data exchanged through the communication paths may include operational status information of each electronic controller.

According to an embodiment, the plurality of communication paths may be a Controller Area Network (CAN), a Serial Peripheral Interface (SPI), Inter-Integrated Circuit (I2C), a Serial Communication Interface (SCI), a General Purpose Input/Output (GPIO), or a Universal Asynchronous Receiver/Transmitter (UART). Further, the plurality of communication paths includes schemes using wireless communication, for example, Bluetooth and Wi-Fi. The plurality of communication paths is not limited thereto and it is apparent that the communication paths can be extended to any communication scheme which can be used for communication between chips or devices.

According to an embodiment, the plurality of communication paths may use the same communication scheme. For example, a first communication path and a second communication path may use all private CAN communication schemes.

According to an embodiment, the plurality of communication paths may use different communication schemes. For example, the first communication path may use a CAN communication scheme and the second communication path may use a GPIO communication scheme. In another example, the first communication path may use a wired communication scheme such as CAN communication and the second communication path may use a wireless communication scheme such as Bluetooth.

Figure 3:
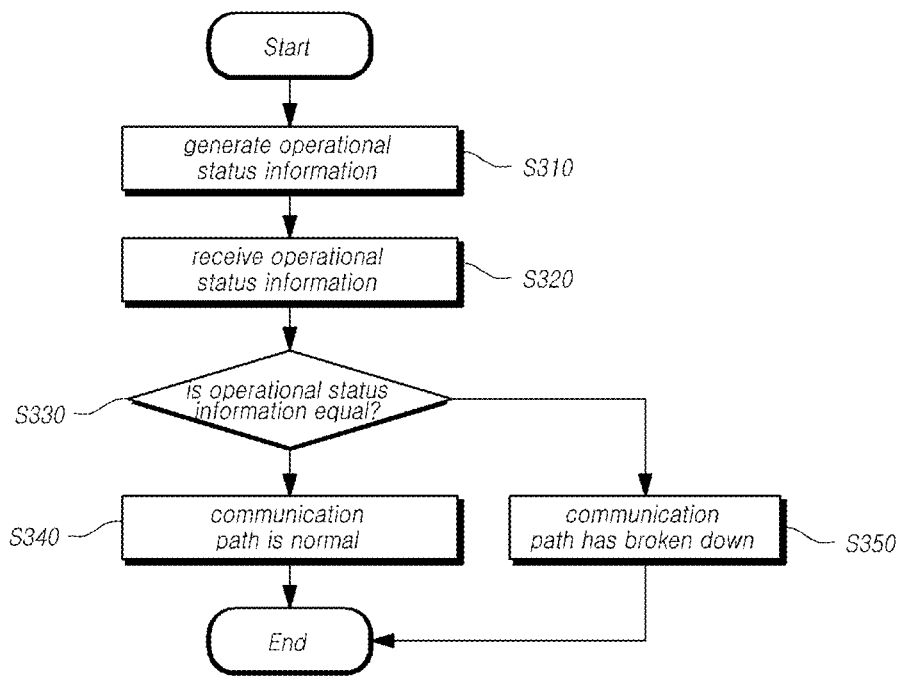
FIG. 3 is a flowchart illustrating a method of controlling the vehicle based on redundant architecture according to an embodiment of the present disclosure.

FIG. 3 is a flowchart illustrating a method of controlling the vehicle based on redundant architecture according to an embodiment of the present disclosure.

Hereinafter, it is apparent that the description of the vehicle control device 120 made through the example in which the method is performed by the vehicle control device 120 of FIG. 1 can be extended to the method.

In step S310, operational status information is generated. Specifically, a plurality of electronic controllers included in the vehicle control device 120 may generate their own operational status information. The operational status information may be information for identifying a status of operation for controlling driving of the vehicle by each electronic controller.

According to an embodiment, the plurality of electronic controllers included in the vehicle control device monitor driving voltages applied to the electronic controllers. The electronic controller may determine an operational status of the electronic controller by monitoring the driving voltage applied to the electronic controller. If a driving voltage applied to the corresponding electronic controller by the electronic controller of one of the electronic controllers is equal to or smaller than a preset reference voltage, the corresponding electronic controller transmits a low-voltage flag signal through a plurality of communication paths as operational status information. Another electronic controller except for the electronic controller of which the measured driving voltage is equal to or smaller than the preset reference voltage may determine the status of the electronic controller transmitting data based on data received through each of the plurality of communication paths. If the another electronic controller receives a low-voltage flag, the another electronic controller determines that the electronic controller of which the measured driving voltage is equal to or smaller than the preset reference voltage has broken down. In this case, the another electronic controller may control driving of the vehicle after a predetermined time from a time point at which a low-voltage flag signal is received. In step S320, operational status information is received. Each of the plurality of electronic controllers in the vehicle control device 120 may receive operational status information of another electronic controller through at least two of the plurality of communication paths. At this time, operational status information received through the respective communication paths may be the same information.

In step S330, it is determined that the plurality of communication paths has broken down. Specifically, each of the plurality of electronic controllers included in the vehicle control device 120 may compare operational status information of another electronic controller received through the plurality of communication paths.

In step S340, it may be determined that the communication paths are normal. Specifically, if operational status information received through the respective communication paths is the same, the electronic controller may determine that the corresponding communication path has not broken down.

In step S350, it may be determined that the communication path has broken down. Specifically, if the operational status information received through the respective communication paths is different, the electronic controller may determine that at least one of the plurality of communication paths has broken down.

Further, if information received through at least one of the plurality of communication paths has an error, the electronic controller may determine that the corresponding communication path has broken down. The error may be an error code according to the communication scheme of each of the plurality of communication paths.

Figure 4:
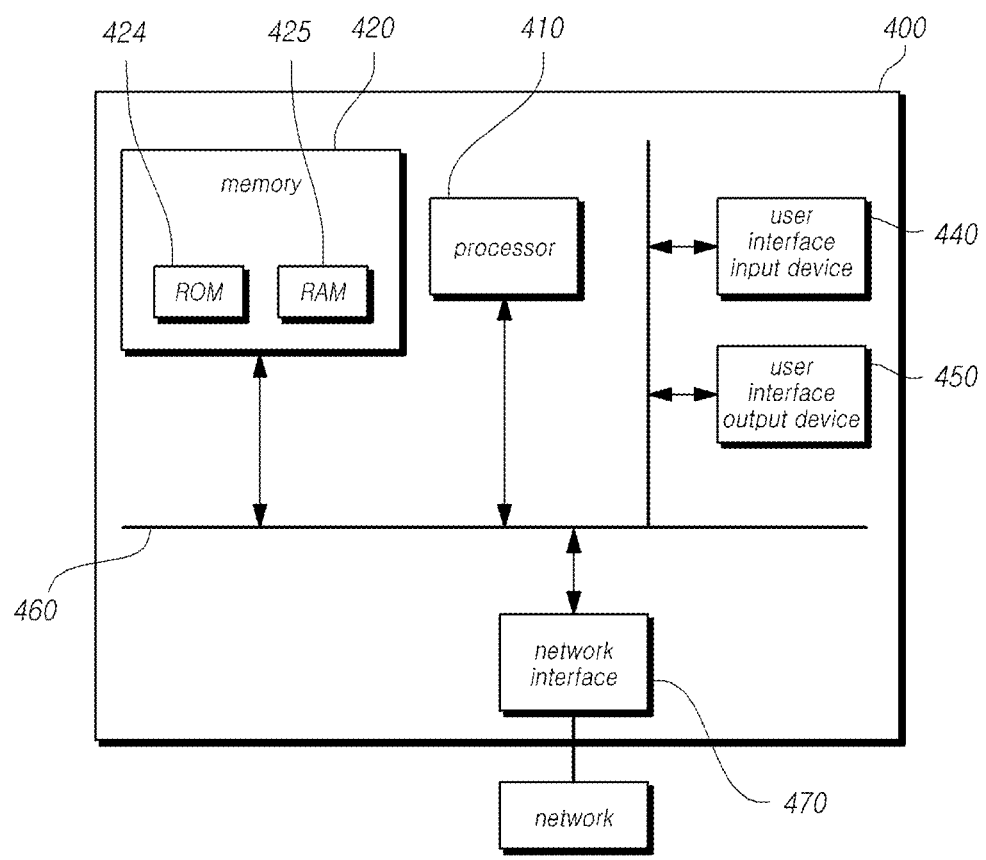
FIG. 4 is a block diagram illustrating the vehicle control device according to another embodiment of the present disclosure.

FIG. 4 is a block diagram illustrating the vehicle control device according to another embodiment of the present disclosure.

The above-described embodiments of the present disclosure may be implemented as, for example, a computer-readable recording medium within a computer system. As illustrated in FIG. 4, a computer system 400 such as the vehicle control device 120 may include at least one element of one or more processors 410, a memory 420, a user interface input device 440, and a user interface output device 450, and the elements may communicate with each other through a bus 460. Further, the computer system 400 may further include a network interface 470 for accessing a network. The processor 410 may be a CPU or a semiconductor device for executing a processing instruction stored in the memory 420. The memory 420 may include various types of volatile/non-volatile recording media. For example, the memory may include ROM 424 and RAM 425.

The methods according to the exemplary embodiments of the present disclosure may be in a form of program commands executed through various computer means to be recorded in a computer readable medium. The computer readable medium may include a program command, a data file, a data structure, and the like independently or in combination.

The aforementioned hardware device may be configured to operate as one or more software programs in order to perform the operation of the present disclosure, and vice versa.

The present disclosure has been described above in connection with the embodiments thereof. It will be understood by those skilled in the art to which the present disclosure belongs that the present disclosure may be implemented in modified forms without departing from the essential characteristics of the present disclosure. Therefore, the embodiments disclosed herein should be considered from an illustrative point of view, rather than a limitative point of view. The scope of the present disclosure is found not in the above description but in the accompanying claims, and all differences falling within the scope equivalent to the claims should be construed as being included in the present disclosure.

What is claimed is:

1. An apparatus for controlling a vehicle having redundant architecture, the apparatus comprising:

a plurality of electronic controllers configured to control driving of the vehicle based on sensing information of the vehicle; and a plurality of communication paths configured to exchange data between the plurality of electronic controllers, wherein the plurality of electronic controllers are configured to generate a vehicle control instruction for controlling the driving of the vehicle and monitor an operational status of at least one of the plurality of electronic controllers through the plurality of communication paths, and one electronic controller of the plurality of electronic controllers is configured to determine whether at least one of the plurality of communication paths has broken down according to data received from an other electronic controller of the plurality of electronic controllers through the plurality of communication paths, wherein the plurality of communication paths correspond to communication paths using different communication schemes, and reliabilities of the communication schemes are different, and the plurality of electronic controllers configured to receive the operational status through the plurality of communication paths are configure to determine whether the plurality of communication paths have broken down based on the reliabilities of the communication schemes of the plurality of communication paths in response to detection that operational statuses received through the plurality of communication paths are different, and wherein the plurality of electronic controllers configured to ignore the data received through the communication path having broken down.

2. The apparatus of claim 1, wherein the plurality of communication paths are at least one of communication schemes including CAN, SPI, I2C, SCI, GPIO, and UART.

3. The apparatus of claim 1, wherein the one electronic controller is configured to control the driving of the vehicle in response to determination that the other electronic controller has broken down.

4. The apparatus of claim 3, wherein the one electronic controller is configured to generate operational status information of the one electronic controller and transmit the generated operational status information of the one electronic controller to the other electronic controller through each of the plurality of communication paths, and the other electronic controller is configured to generate operational status information of the other electronic controller and transmit the generated operational status information of the other electronic controller to the one electronic controller through each of the plurality of communication paths.

5. The apparatus of claim 1, wherein the other electronic controller is configured to transmit equal data to the one electronic controller through each of the plurality of communication paths.

6. The apparatus of claim 5, wherein the one electronic controller is configured to, in response to detection that no data is received from the at least one of the plurality of communication paths, determine that the at least one of the plurality of communication paths has broken down.

7. The apparatus of claim 5, wherein the one electronic controller is configured to determine a status of the other electronic controller based on the data received through the plurality of communication paths, and control the driving of the vehicle after a predetermined time from a time point at which the data is received in response to determination that the status of the other electronic controller is abnormal.

8. The apparatus of claim 1, wherein, the one electronic controller is configured to determine that the plurality of communication paths have not broken down according to a comparison result that the data received through the plurality of communication paths is equal to each other.

9. The apparatus of claim 1, wherein the one electronic controller is configured to detect whether the at least one of the plurality of communication paths has broken down by receiving the data which is transmitted by the other electronic controller, comparing the data received through the plurality of communication paths with each other, and determining that the at least one of the plurality of communication paths has broken down according to a comparison result that the data received through the plurality of communication paths is different from each other.

10. The apparatus of claim 1, wherein the data transmitted by the other electronic controller includes the operational status of the other electronic controller, and the one electronic controller is configured to:
receive the data including the operational status of the other electronic controller transmitted through the plurality of communication paths and compare the data including the operational status of the other electronic controller transmitted through the plurality of communication paths with each other, determine that the at least one of the plurality of communication paths has broken down according to the comparison result that the data received through the plurality of communication paths is different from each other, and determine the operational status of the other electronic controller according to the data including the operational status of the other electronic controller transmitted from the other electronic controller in response to a comparison result that the data received through the plurality of communication paths is identical to each other.

11. A method of controlling a vehicle by a vehicle control device of redundant architecture comprising a plurality of electronic controllers for controlling driving of the vehicle based on sensing information of the vehicle and a plurality of communication paths for exchanging data between the plurality of electronic controllers, the method comprising:

generating operational status information by at least one of the plurality of electronic controllers;

receiving, by one electronic controller of the plurality of electronic controllers, data including operational status information of an other electronic controller of the plurality of electronic controllers through the plurality of communication paths;

determining, by the one electronic controller, whether at least one of the plurality of communication paths has broken down based on the data including the operational status information of the other electronic controller received through the plurality of communication paths; and ignoring, by the one electronic controller, the data received through the communication path having broken down, wherein the plurality of communication paths correspond to communication paths using different communication schemes, and reliabilities of the communication schemes are different, and the determining comprises determining whether the plurality of communication paths have broken down based on the reliabilities of the communication schemes of the plurality of communication paths in response to detection that operational statuses received through the plurality of communication paths are different.

12. The method of claim 11, wherein the plurality of communication paths are at least one of communication schemes including CAN, SPI, I2C, SCI, GPIO, and UART.

13. The method of claim 11, wherein the determining, by the one electronic controller, whether the at least one of the plurality of communication paths has broken down comprises, in response to detection that no data is received from the at least one of the plurality of communication paths, determining that the at least one of the plurality of communication paths has broken down.

14. The method of claim 11, wherein the determining, by the one electronic controller, whether the at least one of the plurality of communication paths has broken down comprises determining that the plurality of communication paths have not broken down according to a comparison result that the data received through the plurality of communication paths is equal to each other.

15. The method of claim 11, wherein the determining, by the one electronic controller, whether the at least one of the plurality of communication paths has broken down comprises receiving the data which is transmitted by the other electronic controller, comparing the data received through the plurality of communication paths with each other, and determining that the at least one of the plurality of communication paths has broken down according to a comparison result that the data received through the plurality of communication paths is different from each other.

16. The method of claim 11, wherein the determining, by the one electronic controller, whether the at least one of the plurality of communication paths has broken down comprises:
receiving, by the one electronic controller, the data including the operational status of the other electronic controller transmitted through the plurality of communication paths and comparing, by the one electronic controller, the data including the operational status of the other electronic controller transmitted through the plurality of communication paths with each other,
determining, by the one electronic controller, that the at least one of the plurality of communication paths has broken down according to the comparison result that the data received through the plurality of communication paths is different from each other, and
determining, by the one electronic controller, the operational status of the other electronic controller according to the data including the operational status of the other electronic controller transmitted from the other electronic controller in response to a comparison result that the data received through the plurality of communication paths is identical to each other.

\* \* \* \* \*